United States Patent
Hansen et al.

(10) Patent No.: US 10,944,719 B2
(45) Date of Patent: Mar. 9, 2021

(54) RESTRICT COMMUNICATIONS TO DEVICE BASED ON INTERNET ACCESS

(71) Applicant: HEWLETT PACKARD ENTERPRISE DEVELOPMENT LP, Houston, TX (US)

(72) Inventors: Peter Hansen, Cypress, TX (US); Andrew Brown, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 250 days.

(21) Appl. No.: 16/133,586

(22) Filed: Sep. 17, 2018

(65) Prior Publication Data
US 2020/0092256 A1    Mar. 19, 2020

(51) Int. Cl.
*H04L 29/06* (2006.01)
*G06F 21/57* (2013.01)
*H04L 12/24* (2006.01)

(52) U.S. Cl.
CPC .......... *H04L 63/0236* (2013.01); *G06F 21/57* (2013.01); *H04L 41/0803* (2013.01); *H04L 63/083* (2013.01); *H04L 63/10* (2013.01); *H04L 63/1441* (2013.01)

(58) Field of Classification Search
CPC .................................................. H04L 63/0236
See application file for complete search history.

(56) References Cited

U.S. PATENT DOCUMENTS

| 7,024,695 | B1* | 4/2006 | Kumar | G06F 11/0748 713/159 |
| 7,712,137 | B2 | 5/2010 | Meier | |
| 7,913,303 | B1 | 3/2011 | Rouland et al. | |
| 9,800,547 | B2 | 10/2017 | Lee et al. | |
| 2016/0364243 | A1* | 12/2016 | Puthillathe | G06F 9/4406 |
| 2017/0109531 | A1 | 4/2017 | Wang et al. | |
| 2019/0042755 | A1* | 2/2019 | Khatri | G06F 21/575 |
| 2020/0137084 | A1* | 4/2020 | Roy | G06N 20/00 |

FOREIGN PATENT DOCUMENTS

CN    105376772 A    3/2016

OTHER PUBLICATIONS

Cisco, "Cisco UCS C-Series Servers Integrated Management Controller Configuration Guide," Jul. 13, 2017, pp. 1-9 (online), Release 1.0(1x), Retrieved from the Internet on Oct. 1, 2018 at URL: <cisco.com/c/en/us/td/docs/unified_computing/ucs/c/sw/gui/config/guide/1-0_1x/b_Cisco_UCS_C-Series_Servers_Integrated_Management_Controller_Configuration_Guide_1-0_1x/Cisco_UCS_C-Series_Servers_Integrated_Management_Controller_Configuration_Guide_1-0_1x_chapter1.html>.

Julie Bort, "Microsoft Urges Users to Disable Vulnerable Windows Network Protocol," Network World, Sep. 21, 2009, pp. 1-3 (online), Retrieved from the Internet on Oct. 1, 2018 at URL: <networkworld.com/article/2237196/microsoft-subnet/microsoft-urges-users-to-disable-vulnerable-windows-network-protocol.html>.

(Continued)

*Primary Examiner* — Simon P Kanaan
(74) *Attorney, Agent, or Firm* — Hewlett Packard Enterprise Patent Department (57) ABSTRACT

Examples disclosed herein relate to securing a controller of a device. The controller is to determine whether a network interface of the device is connected to the Internet. Communications are restricted on the network interface in response to the port having access to the Internet. In some examples, the restriction can be related to a vulnerability.

20 Claims, 4 Drawing Sheets

(56) References Cited

OTHER PUBLICATIONS

Berta Bilbao, "Over 5,000 HPE iLO 4 Interfaces Hit by Ransomware", available online at <https://sensorstechforum.com/5000-hpe-ilo-4-interfaces-hit-ransomware/>, Sensors Tech Forum, Apr. 26, 2018, 16 pages.

Dana Oros, "Are You Still Using Insecure Network Protocols?", available online at <https://www.auvik.com/franklymsp/blog/insecure-network-protocols/?>, Network Security, Sep. 8, 2015, 9 pages.

Lawrence Abrams, "Ransomware Hits HPE iLO Remote Management Interfaces", available online at <bleepingcomputer.com/news/security/ransomware-hits-hpe-ilo-remote-management-interfaces/>, BleepingComputer, Apr. 25, 2018, 17 pages.

Mohit Kumar, "IoT Botnets Found Using Default Credentials for C&C Server Databases", available online at <https://thehackernews.com/2018/06/iot-botnet-password.html>, Jun. 5, 2018, 4 pages.

R/sysdmin, "ILO4 Ransomware—Update your HP ILO", available online at <https://www.reddit.com/r/sysadmin/comments/8faj8v/ilo4_ransomware_update_your_hp_ilo/>, Retrieved on Jan. 27, 2020, 7 pages.

Steve Ragan, "Here are the 61 passwords that powered the Mirai IoT botnet", available online at <https://www.csoonline.com/article/3126924/here-are-the-61-passwords-that-powered-the-mirai-iot-botnet.html>, Oct. 4, 2016, 3 pages.

Anthony Domanico, "How to Troubleshoot your Chromebook's Internet Connection," Jul. 2, 2014, pp. 1-11 (online), PCWorld, Retrieved from the Internet on Sep. 17, 2018 at URL: <pcworld.com/article/2385771/how-to-troubleshoot-your-chromebooks-internet-connection.html>.

Microsoft, "Connecting to Open Wi-Fi Hotspots in Windows 10," 2018, pp. 1-2 (online), Retrieved from the Internet on Sep. 17, 2018 at URL: <privacy.microsoft.com/en-us/windows-10-open-wi-fi-hotspots>.

\* cited by examiner

RESTRICT COMMUNICATIONS TO DEVICE BASED ON INTERNET ACCESS

BACKGROUND

Service providers and manufacturers are challenged to deliver quality and value to consumers, for example by providing remote management capabilities via a network. Examples of devices with remote management capabilities include servers with management controllers, connected devices, etc. Some networks may have access to the Internet.

BRIEF DESCRIPTION OF THE DRAWINGS

The following detailed description references the drawings, wherein.

Throughout the drawings, identical reference numbers may designate similar, but not necessarily identical, elements. An index number "N" appended to some of the reference numerals may be understood to merely denote plurality and may not necessarily represent the same quantity for each reference numeral having such an index number "N". Additionally, use herein of a reference numeral without an index number, where such reference numeral is referred to elsewhere with an index number, may be a general reference to the corresponding plural elements, collectively or individually. In another example, an index number of "I," "M," etc. can be used in place of index number N.

DETAILED DESCRIPTION

Having devices such as management interfaces for servers directly connected to the Internet can raise security issues. For example, a server may include a baseboard management controller (BMC) that can be connected to via a network for remote management. A security camera, thermostat, weather instrumentation, etc. can be connected for management, etc. The intended use for these connected devices can be to be on a network that is not directly accessible to the Internet. Devices on the Internet can be susceptible to attacks from external entities. Malicious agents may attempt to usurp the device with Internet Protocol (IP) address and port range scans for purposes of identifying vulnerabilities and compromising them. Other examples of malicious activity can include installing ransomware, botnet agents, or attempts to extract secure information from the device.

This challenge can compound itself with embedded devices plugged directly onto the Internet to allow for remote access or management of the device. The Internet of Things (IoT) trend has aggravated this situation even further as more and more smart devices migrate to always on, always globally available usage models with direct visibility on the Internet. To protect themselves, operators of these devices may be vigilant about new security vulnerabilities and the availability of firmware updates that address these security vulnerabilities.

Even with the most up to date firmware on a device with all the latest security patches, some protocols that were designed prior to the awareness of all the security risks of the Internet contain baked-in flaws and vulnerabilities that allow insecure access to the device. For example, protocols such as telnet, Remote Authentication Dial-In User Service (RADIUS), Simple Network Management Protocol (SNMP), Remote Management Control Protocol (RMCP), Intelligent Platform Management Interface (IPMI), and many others were inherently insecure by design. Some users may wish to use these protocols due to legacy compatibility. There can be precautions that can be taken, for example, not allowing the controller to be accessed via the Internet by keeping the network separate from a network with Internet access or having a firewall in place. When selling devices to multiple types of customers, some may want these protocols to be supported because the customer datacenter is adequately protected. However, other customers may not have the same protection.

Moreover, in some examples, the devices with network access may not adhere to security best practices. For example, devices on a network may have a default password in place. Default passwords can be an easy target for a botnet agent. Databases of default passwords are available online. Botnet agents may use these in IP address sweep scans to access devices.

In another example, the RMCP+ protocol may have an insecure vulnerability. In the example, the authentication process for the IPMI specification mandates that the server send a salted Secure Hash Algorithm 1 (SHA-1) or message-digest algorithm (MD5) hash of the requested user's password to the client, prior to the client authenticating. If a BMC is to support the protocol, the BMC returns the password hash for any valid user account requested. This password hash can be broken using an offline brute force or dictionary attack. Because this functionality is a part of certain IPMI specifications, fixing the problem would mean deviating from the relevant IPMI specification.

Accordingly, various examples described herein can have a controller associated with a network interface of the device determine whether the network interface has access to the Internet. If the network interface has access to the Internet, a security action can be taken. In some examples, security actions can further be based on whether a device on the Internet is able to communicate with the device. Examples of security actions that can be taken include disabling of support for one or more protocols with a known vulnerability. In some examples, the security action can include disabling one or more subsets of capabilities/actions of a protocol that are associated with a known vulnerability.

In other examples, the security action can be a notification to an administrator that a potential vulnerability exists. In a further example, the security action can include limiting packets parsed by the controller to non-external addresses (e.g., within a same subnet as an address of the network interface).

In other examples, security actions can be taken based on whether the password on the device has been changed. For example, if a default username and/or password or unsecure username and/or password (e.g., a combination known to be on a vulnerability list or not meeting particular criteria) is implemented on the device a security action of disabling Internet access to the controller can be taken. In some examples, the disabling of the Internet access can be implemented until the credentials are changed via another method (e.g., another communication port such as Universal Serial Bus (USB)).

Figure 1:
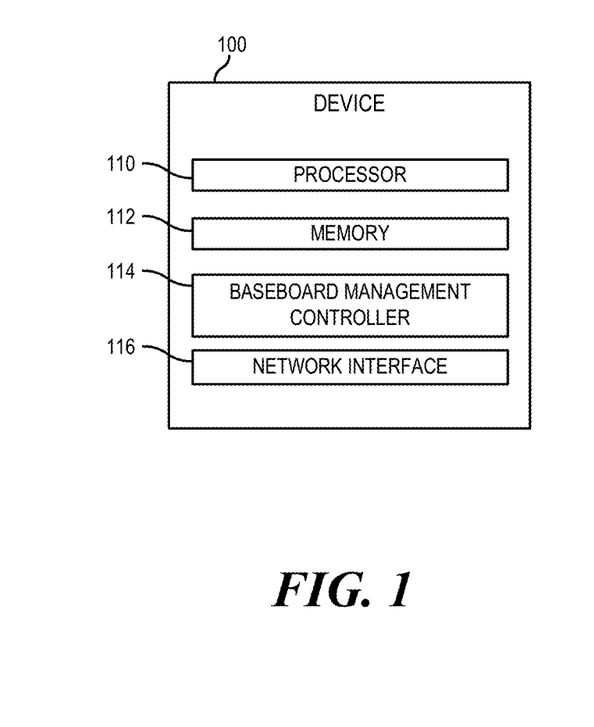
FIG. 1 is a block diagram of a device capable of performing a security action in response to a network interface being connected to the Internet, according to an example.
Figure 2:
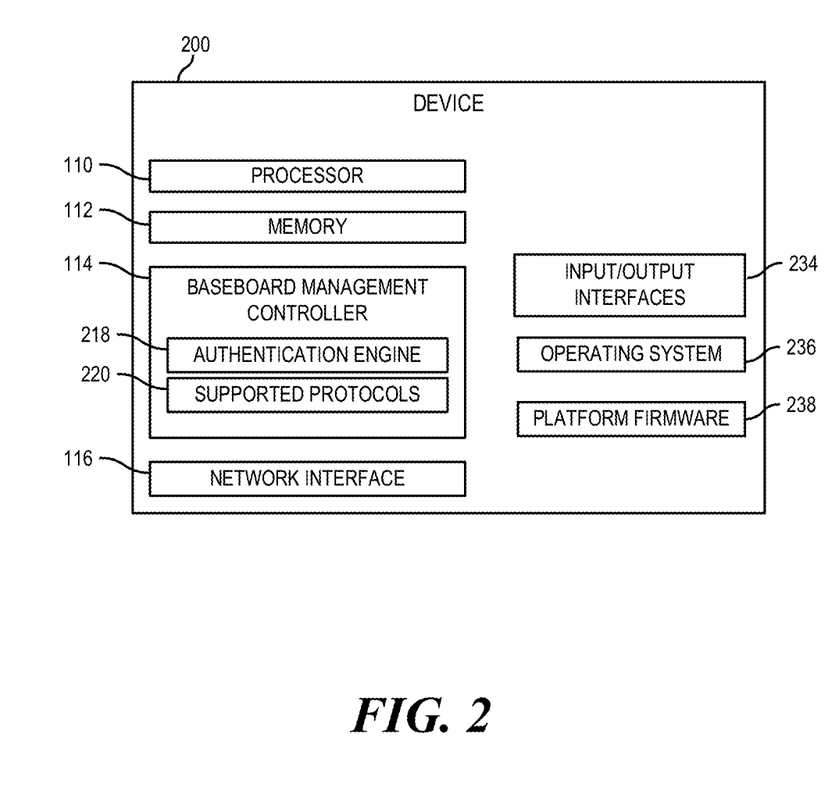
FIG. 2 is a block diagram of a device capable of performing a security action in response to a network interface being connected to the Internet, according to an example.

FIG. 1 is a block diagram of a device capable of performing a security action in response to a network interface being connected to the Internet, according to an example. FIG. 2 is a block diagram of a device capable of performing a security action in response to a network interface being connected to the Internet, according to an example. Device 100 may include at least one processor 110, memory 112, a baseboard management controller (BMC) 114, and a network interface 116. In some examples, the BMC 114 of the device 200 may further include an authentication engine 218 and support a number of supported protocols 220, support one or more input/output interfaces 234, an operating system (OS) 236, and platform firmware 238. The device 100, 200 can be a computing device such as a server, a laptop, a desktop computer, or another network connected device that can be managed via a BMC 114.

Figure 3:
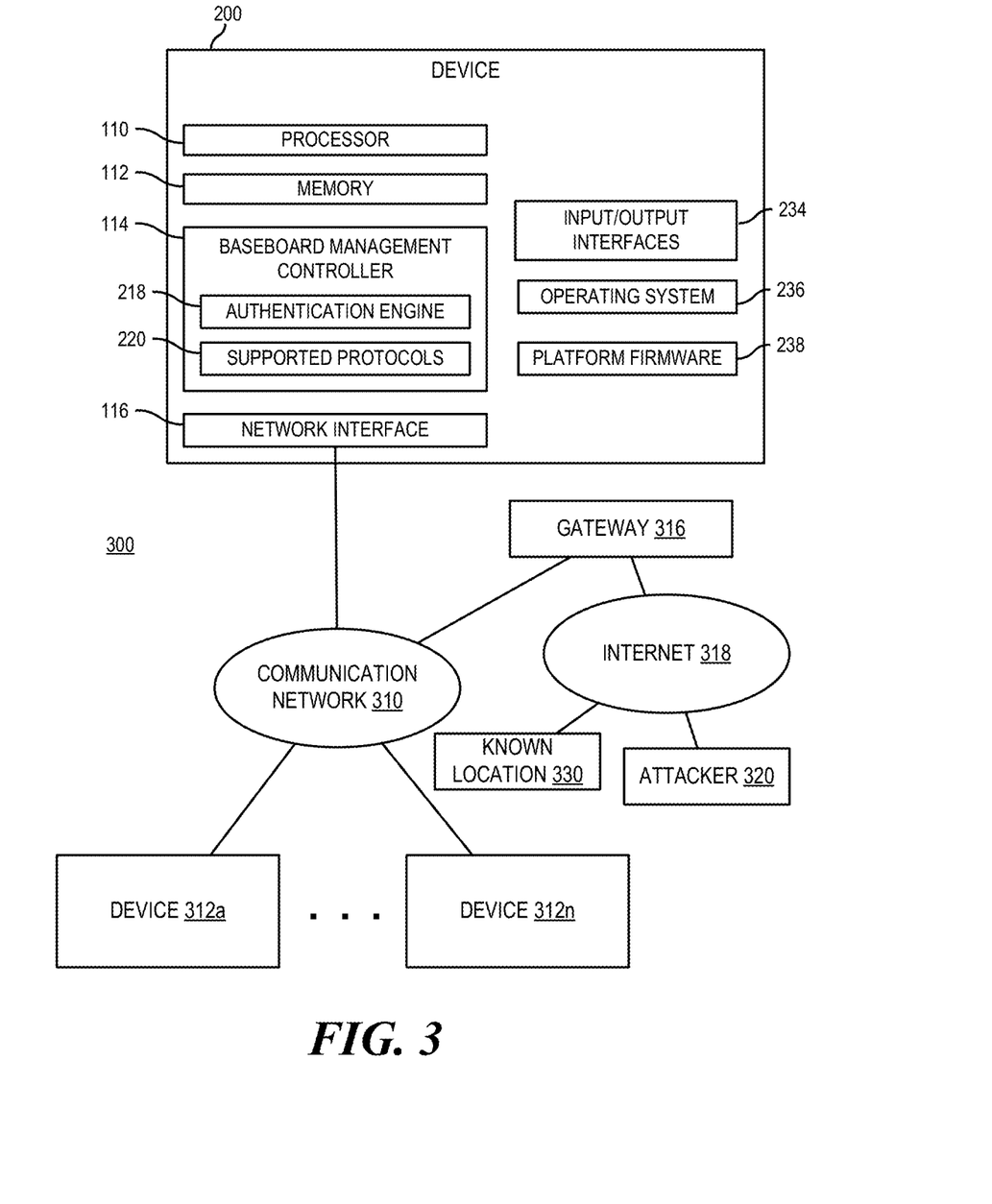
FIG. 3 is a block diagram of a system including a device capable of performing a security action in response to a network interface being connected to the Internet, according to an example.

FIG. 3 is a block diagram of a system 300 including device 200, which is capable of performing a security action in response to a network interface accessible by the BMC 114 being connected to the Internet, according to an example. System 300 includes a communication network 310 that is connected to the BMC 114 via the network interface 116 as well as other devices on the communication network 310 such as devices 312a-312n. In some examples, the communication network 310 can be considered a management network that can be used to manage multiple devices. In some examples, this network would not be connected to the Internet or is firewalled away from the Internet. In other examples one or more gateways 316, routers, switches, etc. can be used to connect the communication network 310 to the Internet 318. As noted above, a BMC 114 connected directly to the Internet 318 may be susceptible to an attacker 320 using one of various attack vectors.

The network interface 116 can be used to connect the BMC 114 to the communication network 310. In some examples, the network interface 116 can be implemented using a network interface card (NIC). In some examples, the network interface 116 can be dedicated to the BMC 114 (e.g., implemented as part of an application specific integrated circuit (ASIC) of the BMC 114. In other examples, the network interface 116 can be separate from the BMC 114, for example, connected to the BMC 114 via a switch controlling traffic. As noted above, the BMC 114 may support one or multiple protocols (supported protocols 220) to help facilitate management of the device 200. Some of these protocols may include vulnerabilities that could be exploited on the Internet (e.g., if security best practices were not followed). Examples provided herein can be used to mitigate exposure to one or multiple vulnerabilities.

The BMC 114 can use a trigger to initiate determination of whether to take an action. In one example, the trigger can include when an IP address for the network interface 116 is established. Establishment of an IP address can be manual or as part of an automatic process, such as using Dynamic Host Configuration Protocol (DHCP) or Bootstrap protocol (BootP). In some examples, other changes to a configuration of the network interface 116 can be used as a trigger (e.g., an addition of a gateway, change to subnet, etc.). In some examples, an interrupt, hook, polling, etc. can be used to provide the BMC 114 with the information about the network interface 116 or the BMC 114 can maintain the network configuration information. When a trigger occurs, or at another time, the BMC 114 can determine, using the network interface 116, whether the network interface 116 is connected to/has access to an external network, for example, the Internet. Moreover, in some examples, a trigger can be based on a timer, for example, the BMC 114 can periodically check whether it has access to the Internet. This can be implemented in case something in the surrounding network changed.

In one example, the BMC 114 determines whether there is access to an external network. This can be via determination that the BMC 114 has access to a gateway 316 via the network interface 116. This can be included in the network configuration of the network interface 116. In another example, if a packet is received with a time to live of greater than 0, it can represent that the BMC 114 can be accessed by a network outside of its subnet.

In one example, the BMC 114 can ping a known location 330 on the Internet to determine that the BMC 114 has access to that known location 330. In some examples, if the known location can respond, it means that the network interface 116 has access to the Internet. In another example, the BMC 114 can ask the known location 330 to respond via a particular port (or set of ports) and if the communication is successful, it indicates that there is not a NAT firewall in place or that the NAT firewall allows that traffic through. In another example, the known location 330 can be associated with a manufacturer of the device 200 and a trusted relationship can be used. For example, the BMC 114 can request that the known location 330 perform a network mapper (Nmap) and provide the BMC with information about what information it can access about the BMC 114. If a firewall is in place, this can help determine one or multiple ports that may provide access to an attacker 320. In some examples, the known location 330 can provide a cryptographic hash that the BMC 114 can decode via an authentication engine 218 using a private key, use a certificate for authentication, provide other credentials, etc. Other approaches can be taken to determine whether the BMC 114 has access to the Internet and/or is accessible from the Internet.

A security action can be taken in response to determining that the network interface 116 has access to an external network, to the Internet 318, to the known location 330, a combination thereof, etc. In some examples, additional parameters can be taken into account, for example, whether there is a firewall in place or whether there are particular open ports through a firewall.

As noted, the BMC 114 can attempt to access a known external address (e.g., known location 330) on the Internet 318 and request information corresponding to whether a device at the external address is capable to access the BMC 114. The security action can be based on the device being able to access the BMC 114. As noted, the BMC 114 may use the authentication engine 218 to authenticate the known location 330. In one example, protocols that have vulnerabilities associated with open ports may be disabled. In some examples, the manufacturer of the device can be responsible for the known location, thus the BMC 114 can trust the communications received from the known location 330 based on authentication capabilities set during a manufacturing of the device.

In one example, the BMC 114 performs a security action in response to the detection of the BMC 114 having access to the Internet. In some examples, the security action can further be based on additional parameters. In one example, the security action can include sending a message to an administrator associated with the device 200 alerting of the potential vulnerability.

In another example, the BMC 114 can restrict communications on the network interface 116. For example, the BMC 114 can disable support for any of the supported protocols 220 that may have a vulnerability. In some examples, a data structure, such as a table, a linked list, etc. can be used to identify each of the supported protocols 220 as well as if there is a known vulnerability. In these examples, if there is a vulnerability associated, the protocol can be disabled. In some other examples, additional parameters can be taken into account, for example, whether the protocol is associated with particular ports, and if the particular ports are accessible externally, disable the protocol. For example, if there is Internet access and a first parameter (e.g., no firewall), restrict communications in a first way for a first protocol, if there is Internet access and a second parameter (a firewall, but access through a particular port), restrict communications in a second way for a second protocol. Further, in some example, portions of the protocol may be associated with vulnerabilities and a subset of the protocol can be disabled while another subset of supported actions of the protocol can be enabled. Examples of protocols can include RMCP, SNMP, telnet, remote shell (rsh), and the like.

In another example, packets parsed by the BMC 114 can be limited to local traffic. For example, as part of the security action, communications can be restricted by limiting traffic used by the BMC 114 to packets on the same subnet as the network interface 116. In some examples, the network interface 116 can mark outgoing insecure IP packets to have a time to live or hop count of 0 to limit packets to the local network. In another example, restricting communications can include refusing traffic from a protocol with a known vulnerability from IP addresses that are not within the same subnet as the network interface 116. The granularity for the security action can vary, for example, only one protocol may be affected, multiple protocols may be affected, or the BMC 114 can disable its entire communication from the network interface 116.

In one example, if a default or known insecure password is implemented on the BMC 114, the security action may include removing the BMC 114 from access via the network interface 116. In some examples, this can be implemented until a user changes the password via another communication port (e.g., via a serial bus, parallel port, keyboard interface, an option ROM, a console bootup, or universal serial bus (USB) communication). In another example, the BMC 114 can disable one or more protocols and/or parsing of received packets until Internet access is removed (e.g., configuration for the network interface 116 removes a gateway). In some examples, only packets with a TTL of 0 would be parsed until the password is changed. This example would allow accessibility of the BMC 114 without having the BMC open to an external threat by an attacker 320. In some examples, the security action can include entering into a heightened security mode, such as a Federal Information Processing Standards (FIPS) mode.

In the above example related to the RMCP+ protocol, the routine associated with responding to a request for a password hash for a valid user account can be disabled. In some examples, the routine itself is disabled, in other examples, the whole protocol can be disabled. Further, in some examples, the protocol may be limited to only providing the information to devices on a same subnet as the BMC 114, for example, by making a TTL for a packet including such information as 0.

Devices 312a-312n may be management devices on the network. The devices may be other BMCs or include a management console such as a centralized management system that can be used to manage multiple BMCs.

The BMC 114 can be implemented using a separate processor from the processor(s) 110 that is/are used to execute a high level operating system 236. BMCs 114 provide so-called "lights-out" functionality for computing devices. The lights out functionality may allow a user, such as a systems administrator to perform management operations on the device 100, 200 even if an operating system is not installed or not functional on the device 200. Moreover, in one example, the BMC 114 can run on auxiliary power, thus the device 100, 200 need not be powered on to an on state where control of the device 100, 200 is handed over to an operating system 236 after boot. As examples, the BMC 114 may provide so-called "out-of-band" services, such as remote console access, remote reboot and power management functionality, monitoring health of the system, access to system logs, and the like. As used herein, a BMC 114 has management capabilities for sub-systems of a device 100, 200.

As noted, in some instances, the BMC 114 may enable lights-out management of the computing device 100, which provides remote management access (e.g., system console access) regardless of whether the computing device 100 is powered on, whether a primary network subsystem hardware is functioning, or whether an OS 236 is operating or even installed. The BMC 114 may comprise an interface, such as a network interface, and/or serial interface that an administrator can use to remotely communicate with the BMC 114. In some examples, the network interface 116 can be implemented as a network interface for the BMC 114. In other examples, internal circuitry (e.g., a switch) can be used to provide the BMC 114 the ability to communicate using a network interface via a shared network interface 116. As used herein, an "out-of-band" service is a service provided by the BMC 114 via a dedicated management channel (e.g., the network interface or serial interface) and is available whether the device 100, 200 is in powered on state.

In some examples, a BMC 114 may be included as part of an enclosure. In other examples, a BMC 114 may be included in one or more of the servers (e.g., as part of the management subsystem of the server) or connected via an interface (e.g., a peripheral interface). In some examples, sensors associated with the BMC 114 can measure internal physical variables such as humidity, temperature, power supply voltage, communications parameters, fan speeds, operating system functions, or the like. The BMC 114 may also be capable to reboot or power cycle the device.

In one example, the BMC 114 may be associated with a secure storage, a hardware root of trust, and/or other security features. In one example, on initial boot of the device 200 into a service operating system (OS) or provisioning engine in a factory, a unique private and public key are generated and 'glued' onto the system by being saved into the BMC storage. This storage can be persistent and not replaceable. The BMC 114 may allow access to a key using an application programming interface. The values can be written to a write once register on a same Application Specific Integrated Circuit (ASIC) as the BMC. The write once register can be implemented, for example, using fuses. In one example, the private key is created by executing an algorithm using random sources and is programmed. In another example, the public key is a cryptographic hash of the private key. In some examples, once programmed, the ability to change the registers is disabled (e.g., severing a fuseable link, for example, on a write line). In some examples, the BMC 114 can be used to ensure that information from an external source (e.g., a known location) is authentic.

The communication network 310 can use wired communications, wireless communications, or combinations thereof. Further, the communication network 310 can include multiple sub communication networks such as data networks, wireless networks, telephony networks, etc. Such networks can include, for example, a public data network such as the Internet, local area networks (LANs), wide area networks (WANs), metropolitan area networks (MANs), cable networks, fiber optic networks, combinations thereof, or the like. In certain examples, wireless networks may include cellular networks, satellite communications, wireless LANs, etc. Further, the communication network 310 can be in the form of a direct network link between devices. Various communications structures and infrastructure can be utilized to implement the communication network(s). As used herein, Internet is a global system of interconnected computer networks that uses the Internet protocol suite (TCP/IP) to link devices worldwide.

By way of example, the device 200 and devices 312a-312n communicate with each other and other components with access to the communication network 310 via a communication protocol or multiple protocols. A protocol can be a set of rules that defines how nodes of the communication network 312 interact with other nodes. Further, communications between network nodes can be implemented by exchanging discrete packets of data or sending messages. Packets can include header information associated with a protocol (e.g., information on the location of the network node(s) to contact) as well as payload information. Though devices 312a-312n are shown, it is contemplated that different configurations of devices on the communication network 310 are possible. The devices can be implemented via a processing element, memory, and/or other components.

The authentication engine 218 can include hardware and/or combinations of hardware and programming to perform functions provided herein. Moreover, the modules (not shown) can include programming functions and/or combinations of programming functions to be executed by hardware as provided herein. When discussing the engines and modules, it is noted that functionality attributed to an engine can also be attributed to the corresponding module and vice versa. Moreover, functionality attributed to a particular module and/or engine may also be implemented using another module and/or engine.

A processor 110, such as a central processing unit (CPU) or a microprocessor suitable for retrieval and execution of instructions and/or electronic circuits can be configured to operate the device 200. In certain scenarios, instructions and/or other information, such as supported protocols 220, can be included in memory 112 or other memory. Input/output interfaces 234 may additionally be provided by the device 200. For example, input devices, such as a keyboard, a sensor, a touch interface, a mouse, a microphone, etc. can be utilized to receive input from an environment surrounding the device 100, 200. Further, an output device, such as a display, can be utilized to present information to users. Examples of output devices include speakers, display devices, amplifiers, etc. Moreover, in certain examples, some components can be utilized to implement functionality of other components described herein. Input/output devices such as communication devices like network communication devices or wireless devices can also be considered devices capable of using the input/output interfaces.

In some examples, the BMC 114 can be implemented as an out of band management system. In contrast, the platform firmware 238 can be executed at the boot of the device 200 by execution of platform firmware 238 by the processor 110. In some examples, during a boot process, the platform firmware 238 can turn over the operation of the device 200 to an operating system 236. In some examples, the platform firmware 238 can be implemented as a basic input output system or a unified extensible firmware interface.

Though the Internet 318 is used as an example as a trigger for restricting communications as part of a security action, other triggers can be used as well. For example, the BMC 114 having access to or being accessible from a device external to a local communication network (e.g., via the presence of a gateway) may be a trigger to cause implementation of the security features described herein.

Figure 4:
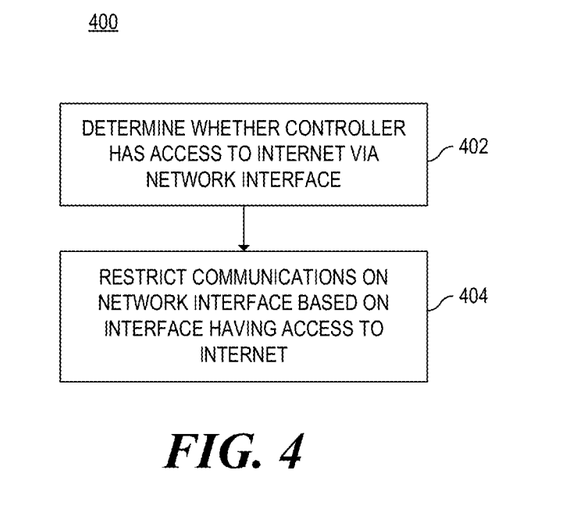
FIG. 4 is a flowchart of a method for determining whether a controller has access to the Internet and restrict communications based on the port having access to the Internet, according to an example.
Figure 5:
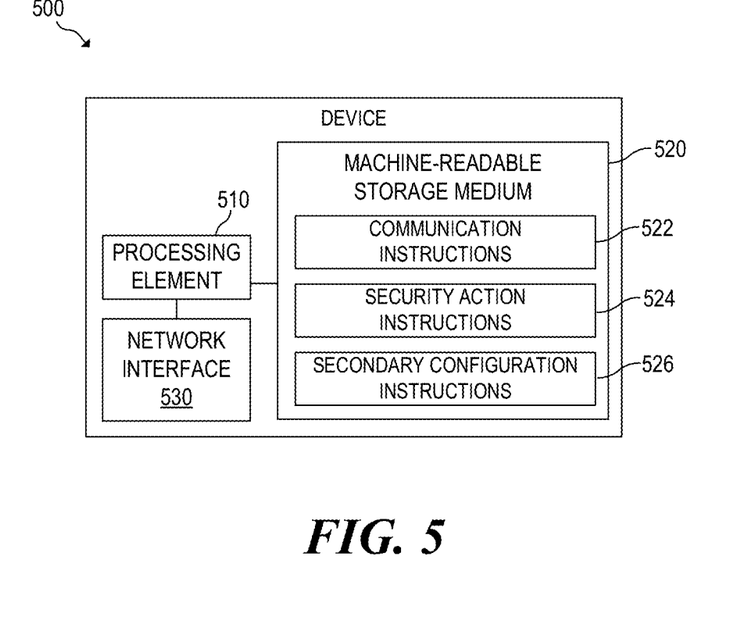
FIG. 5 is a block diagram of a device capable of restricting access to a controller of the device based on whether the device has access to the Internet, according to an example.

FIG. 4 is a flowchart of a method for determining whether a controller has access to the Internet and restrict communications based on the port having access to the Internet, according to an example. FIG. 5 is a block diagram of a device capable of restricting access to a controller of the device based on whether the device has access to the Internet, according to an example. The device 500 includes, for example, a processing element 510, and a machine-readable storage medium 520 including instructions 522, 524, 526 for keeping the device 500 secure. Device 500 may be, for example, a notebook computer, a slate computing device, a portable reading device, a camera, an embedded device, a server, or other computing device capable of performing the functionality described herein.

Processing element 510 may be, one or multiple central processing unit (CPU), one or multiple semiconductor-based microprocessor, one or multiple graphics processing unit (GPU), other hardware devices suitable for retrieval and execution of instructions stored in machine-readable storage medium 520, or combinations thereof. The processing element 510 can be a physical device. Moreover, in one example, the processing element 510 may include multiple cores on a chip, include multiple cores across multiple chips, multiple cores across multiple devices (e.g., if the device 500 includes multiple node devices), or combinations thereof. Processing element 510 may fetch, decode, and execute instructions 522, 524, 526 to implement restrict communications on a network interface in response to determining that a controller has access to the Internet. As an alternative or in addition to retrieving and executing instructions, processing element 510 may include at least one integrated circuit (IC), other control logic, other electronic circuits, or combinations thereof that include a number of electronic components for performing the functionality of instructions 522, 524, 526.

Machine-readable storage medium 520 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium 520 may be encoded with a series of executable instructions for determining whether the device 500 is connected to the Internet via network interface 530 and perform a security action in response to the detection.

In some examples, the processing element 510 and machine-readable storage medium 520 can combine to implement a BMC. In other examples, the device 500 can be an embedded system or a part of a computing system. For example, the device may be implemented as a BMC that is included as part of a computing system, where the BMC is separate from a central processor of the computing system. Though the device 500 is meant to connect to a network, the device 500 may be intended to not be accessible from the Internet, for example, in the case of a BMC, a home security camera, another management interface or controller of a computing system or embedded system, etc.

At 402, communications instructions 522 can be executed by processing element 510 to determine whether the network interface 530 of the device has access to the Internet. In some examples, secondary configuration instructions 526 can be executed to determine whether there are secondary configuration parameters that can be used to help secure the device 500. Example secondary configuration parameters include whether the device 500 is behind a firewall, parameters/vulnerability information associated with supported protocols of the device, network information, etc.

In one example, the device 500 determines whether there is access to an external network. This can be via a determination that the device 500 has access to a gateway via the network interface 530. This can be included in the network configuration of the network interface 530. In another example, if a packet is received with a time to live of greater than 0, it can represent that the device 500 can be accessed by a network outside of its subnet.

In one example, the device 500 can ping or otherwise attempt to access a known location on the Internet to determine that the device 500 has access to that known location and thus is on the Internet. In some examples, if the known location can respond, it means that the network interface 530 has access to the Internet. In another example, the device 500 can ask the known location to respond via a particular port (or set of ports) and if the communication is successful, it indicates that there is not a NAT firewall in place or that the NAT firewall allows that traffic through. These can be considered secondary configuration parameters.

In another example, the known location can be associated with a manufacturer of the device 500 and a trusted relationship can be used. For example, the device 500 can request that the known location perform a network mapper (Nmap) and provide the device 500 with information about what information it can access about the device. If a firewall is in place, this can help determine one or multiple ports that may provide access to an attacker on the Internet. In some examples, the known location can provide a cryptographic hash that the device 500 can decode using a private key, use a certificate for authentication, provide other credentials, etc.

At 404, the device 500 can execute security action instructions 524 to perform a security action in response to the determination that the device 500 has access to the Internet. As noted, the security action taken can include restricting communications on the network interface 530 by the device 500 in response to the network interface 530 having access to the Internet. As noted, the restriction can be based on further configuration parameters.

As described above, the restriction of communication can include disabling one or more communications protocol supported by the device over the network interface 530. As noted above, this can further be based on further configuration parameters, such as whether a firewall is present, vulnerabilities associated with the communications protocol, etc. In another example, the restriction can include limiting access of the communication protocol to a subset of supported actions of the communication protocol based on a known vulnerability associated with the protocol. For example, particular functionality can be disabled. In the example of an IPMI compliant protocol, when a valid user account is requested, the ability to send a salted SHA-1 or MD5 hash can be disabled. In another example, the restriction of the communication of the network interface 530 can include limiting traffic used by the device 500 to traffic on a same subnet as the network interface 530.

Figure 6:
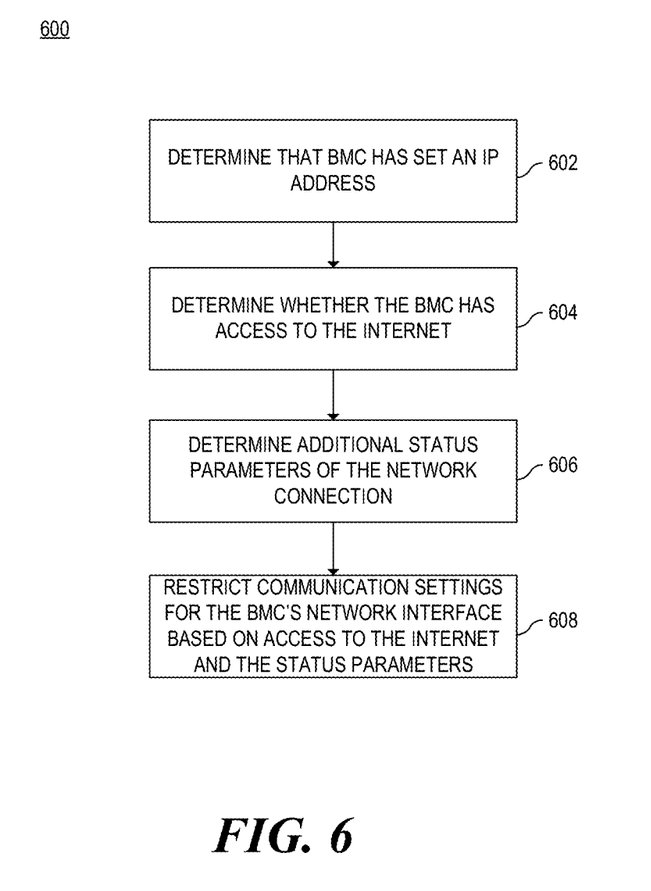
FIG. 6 is a flowchart of a method for determining whether a baseboard management controller has access to the Internet and restrict communications based on the port having access to the Internet and additional status parameters, according to an example.

FIG. 6 is a flowchart of a method for determining whether a baseboard management controller has access to the Internet and restrict communications based on the port having access to the Internet and additional status parameters, according to an example. Although execution of method 600 is described below with reference to device 200, other suitable components for execution of method 600 can be utilized (e.g., device 100, 500). Additionally, the components for executing the method 600 may be spread among multiple devices. Method 600 may be implemented in the form of executable instructions stored on a machine-readable storage medium, such as a storage medium, and/or in the form of electronic circuitry.

At 602, the BMC 114 can determine that a network interface 116 communicatively coupled to the BMC 114 has set an IP address. The IP address can be set manually or as part of an automatic configuration. In response to the determination that the network address has been set, at 604, the BMC 114 determines whether the BMC 114 has access to the Internet via the network interface 116. At 606, the BMC 114 can determine additional status parameters of the network connection. As noted above, the additional status parameters can include information received from a device at a known external location (e.g., via a Nmap). At 608, the BMC 114 can restrict communication settings for the BMC's network interface based on access to the Internet and status parameters as detailed above.

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. Furthermore, it should be appreciated that the systems and methods described herein can include various combinations and/or sub-combinations of the components and/or features of the different implementations described. Thus, features described with reference to one or more implementations can be combined with other implementations described herein. For example, though explanation of various examples relate to a BMC, it is contemplated that other management interfaces can perform similar functionality, for example, management interfaces for a connected device, a management interface to control one or multiple servers that is implemented in a virtual machine, etc.

What is claimed is:
1. A device comprising:
   a processor and a memory;
   a baseboard management controller (BMC), separate from the processor, that is capable of providing out of band services;

a network interface to communicate with the BMC, wherein the BMC is to:
  determine, via the network interface, whether the network interface has access to the Internet,
  determine communication protocols supported by the BMC, based on accessing a data structure that identifies the communication protocols supported by the BMC, wherein each communication protocol of the communication protocols includes a set of rules that defines how nodes interact with one another over a communication network, and
  perform a security action in response to determining that the network interface has access to the Internet, the security action comprising disabling a communication protocol of the communication protocols determined to be supported by the BMC based on accessing the data structure.

2. The device of claim 1, wherein the BMC is to restrict communications on the network interface as part of the security action.

3. The device of claim 1, wherein the communication protocols comprise a Remote Management Control Protocol (RMCP), and the disabled communication protocol is the RMCP.

4. The device of claim 1, wherein the BMC is to disable access to the BMC via the network interface as part of the security action in response to determining that an insecure password is being used on the BMC.

5. The device of claim 2, wherein the BMC is to restrict the communications on the network interface by:
  determining whether a packet received by the BMC via the network interface has an address that is associated with a first subnet different from a second subnet to which the network interface is connected, and
  disabling parsing of the packet in response to determining that the packet has the address that is associated with the first subnet different from the second subnet.

6. The device of claim 1, wherein the BMC is to determine that there is access to the Internet based on detecting a packet received by the network interface with a time to live value of greater than zero.

7. The device of claim 2, wherein the BMC is to restrict the communications on the network interface as part of the security action by limiting traffic used by the BMC to traffic on a same subnet as the network interface.

8. The device of claim 1, wherein the BMC is to attempt to access a known external address on the Internet and request information corresponding to whether a remote device at the known external address is capable of responding to the BMC, wherein the security action is further in response to the device being capable of responding to the BMC.

9. The device of claim 8, wherein the requested information comprises a cryptographic hash value, and wherein the BMC is to determine that the network interface has access to the Internet responsive to receiving the cryptographic hash value from the remote device at the known external address.

10. A method comprising:
  determining, by a baseboard management controller (BMC) of a computing system, whether a network interface connected to the BMC has access to an external network that is external of a subnet to which the network interface is connected, wherein the BMC is separate from a processor that executes an operating system of the computing system; and
  restricting, by the BMC, communications on the network interface, in response to the network interface having access to the external network, wherein restricting the communications by the BMC comprises limiting traffic used by the BMC to traffic on the subnet to which the network interface is connected such that traffic from a different subnet is not parsed by the BMC.

11. The method of claim 10, further comprising:
  disabling a communication protocol of a plurality of communication protocols supported by the BMC over the network interface as part of the restricting of the communications on the network interface.

12. The method of claim 10, further comprising:
  disabling access to the BMC from the network interface in response to an insecure password being used on the BMC.

13. The method of claim 11, further comprising:
  determining, by the BMC, the plurality of communication protocols supported by the BMC based on accessing a data structure that identifies the plurality of communication protocols supported by the BMC, wherein each communication protocol of the plurality of communication protocols includes a set of rules that defines how nodes interact with one another over a communication network.

14. The method of claim 13, wherein the data structure identifies a vulnerability of a communication protocol of the plurality of communication protocols.

15. The method of claim 10, further comprising:
  attempting, by the BMC to access a known external address on the external network and request information corresponding to whether a remote device at the known external address is capable of responding to the BMC, wherein the restricting of the communications on the network interface is further in response to the remote device being capable of responding to the BMC.

16. A non-transitory machine-readable storage medium storing instructions that upon execution cause a baseboard management controller (BMC) of a device to:
  determine whether a network interface of the device connected to the BMC has access to the Internet and is not behind a firewall;
  determine communication protocols supported by the BMC, based on accessing a data structure that identifies the communication protocols supported by the BMC, wherein each communication protocol of the communication protocols includes a set of rules that defines how nodes interact with one another over a communication network; and
  restrict communications on the network interface in response to the network interface having access to the Internet and not being behind the firewall, wherein the restricting of the communications on the network interface comprises disabling a communication protocol of the communication protocols determined to be supported by the BMC based on accessing the data structure.

17. The non-transitory machine-readable storage medium of claim 16, wherein the data structure further identifies a vulnerability of the communication protocol that is disabled.

18. The non-transitory machine-readable storage medium of claim 16, further comprising instructions that upon execution cause the BMC to:
  disable access to the BMC from the Internet via the network interface in response to an insecure password being used for authentication on the BMC.

19. The non-transitory machine-readable storage medium of claim 16, further comprising instructions that upon execution cause the BMC to:
  limit traffic used by the BMC to traffic on a same subnet as the network interface as part of restricting the communications.

20. The non-transitory machine-readable storage medium of claim 16, wherein the BMC is separate from a central processing unit of the device, and wherein the BMC is to provide an out of band service to the device.

\* \* \* \* \*